United States Patent
Chiu et al.

(10) Patent No.: US 11,567,747 B2
(45) Date of Patent: Jan. 31, 2023

(54) SYSTEM AND METHOD FOR DYNAMIC CONFIGURATION SETTING UPDATE OF A BIOS FIRMWARE IMAGE

(71) Applicant: DELL PRODUCTS, LP, Round Rock, TX (US)

(72) Inventors: Chih-Wei Chiu, Kindian District (TW); Nelson Fu, Xizhi District (TW); Smith Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 17/128,289

(22) Filed: Dec. 21, 2020

(65) Prior Publication Data

US 2022/0197624 A1     Jun. 23, 2022

(51) Int. Cl.
    *G06F 8/61*       (2018.01)
    *G06F 13/42*      (2006.01)
    *G06F 9/4401*     (2018.01)
    *G06F 8/65*       (2018.01)

(52) U.S. Cl.
    CPC .............. *G06F 8/63* (2013.01); *G06F 8/65* (2013.01); *G06F 9/4406* (2013.01); *G06F 13/4282* (2013.01)

(58) Field of Classification Search
    CPC . G06F 8/63; G06F 8/65; G06F 9/4406; G06F 13/4282
    See application file for complete search history.

(56) References Cited

U.S. PATENT DOCUMENTS

| | | | |
|---|---|---|---|
| 8,504,811 B2 | 8/2013 | Yang et al. | |
| 10,013,387 B2* | 7/2018 | Kumar | G06F 3/0655 |
| 10,025,576 B2* | 7/2018 | Martinez | G06F 21/60 |
| 10,459,742 B2 | 10/2019 | Liu et al. | |
| 10,776,492 B2* | 9/2020 | Samuel | G06F 21/572 |
| 10,936,301 B2* | 3/2021 | Suryanarayana | G06F 16/1847 |
| 11,003,780 B2* | 5/2021 | Liu | G06F 8/654 |
| 2002/0194313 A1* | 12/2002 | Brannock | H04L 67/34 717/176 |
| 2015/0067424 A1* | 3/2015 | Waltermann | G01R 31/318536 714/726 |
| 2016/0147996 A1* | 5/2016 | Martinez | H04L 9/0877 713/171 |
| 2017/0168844 A1* | 6/2017 | Swanson | G06F 21/55 |
| 2018/0150302 A1* | 5/2018 | Chuang | G06F 13/4282 |

(Continued)

OTHER PUBLICATIONS

Zhang et al., "A Framework to Secure Peripherals at Runtime", 2014, Springer International Publishing Switzerland, pp. 219-238 (Year: 2014).*

(Continued)

*Primary Examiner* — Wei Y Zhen
*Assistant Examiner* — Junchun Wu
(74) *Attorney, Agent, or Firm* — Larson Newman, LLP (57) ABSTRACT

An information handling system include a serial peripheral interface (SPI) flash memory device with a BIOS firmware of a platform, and a processor that may build a hand-off block for platform specific override data for the platform, and patch the BIOS base firmware image with the platform specific override data to modify the BIOS base firmware image according to the platform. The processor may also update the BIOS firmware in the SPI flash memory device with the BIOS base firmware image.

20 Claims, 4 Drawing Sheets

(56) References Cited

U.S. PATENT DOCUMENTS

| | | | |
|---|---|---|---|
| 2019/0179628 A1* | 6/2019 | Bulusu | G06F 9/4401 |
| 2019/0391944 A1* | 12/2019 | Seiler | G06K 19/07732 |
| 2020/0218811 A1* | 7/2020 | Rangel-Martinez | G06F 21/572 |
| 2020/0310774 A1 | 10/2020 | Zhu et al. | |
| 2020/0326930 A1 | 10/2020 | Suryanarayana et al. | |

OTHER PUBLICATIONS

Regenscheid, "BIOS Protection Guidelines for Servers", Aug. 2014, http://dx.doi.org/10.6028/NIST.SP.800-147B (Year: 2014).*

Lambert, "Enterprise Platform Systems Management Security Threats and Mitigation Techniques", Dec. 2016, The University of Texas at Austin (Year: 2016).*

Wilkins et al., "UEFI Secure Boot in Modern Computer Security Solutions", Sep. 2013, UEA (Year: 2013).*

\* cited by examiner

SYSTEM AND METHOD FOR DYNAMIC CONFIGURATION SETTING UPDATE OF A BIOS FIRMWARE IMAGE

FIELD OF THE DISCLOSURE

The present disclosure generally relates to information handling systems, and more particularly relates to dynamic configuration setting update of a BIOS firmware image.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A BIOS base firmware image of a first platform may be stored in a memory of a second platform. A hand-off block may be built for platform specific override data for the second platform, and the BIOS base firmware image may be patched, including modifying the BIOS base firmware image with the platform specific override data. Subsequent to patching the BIOS base firmware image, BIOS firmware may be updated in a serial peripheral interface flash memory device with the BIOS base firmware image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
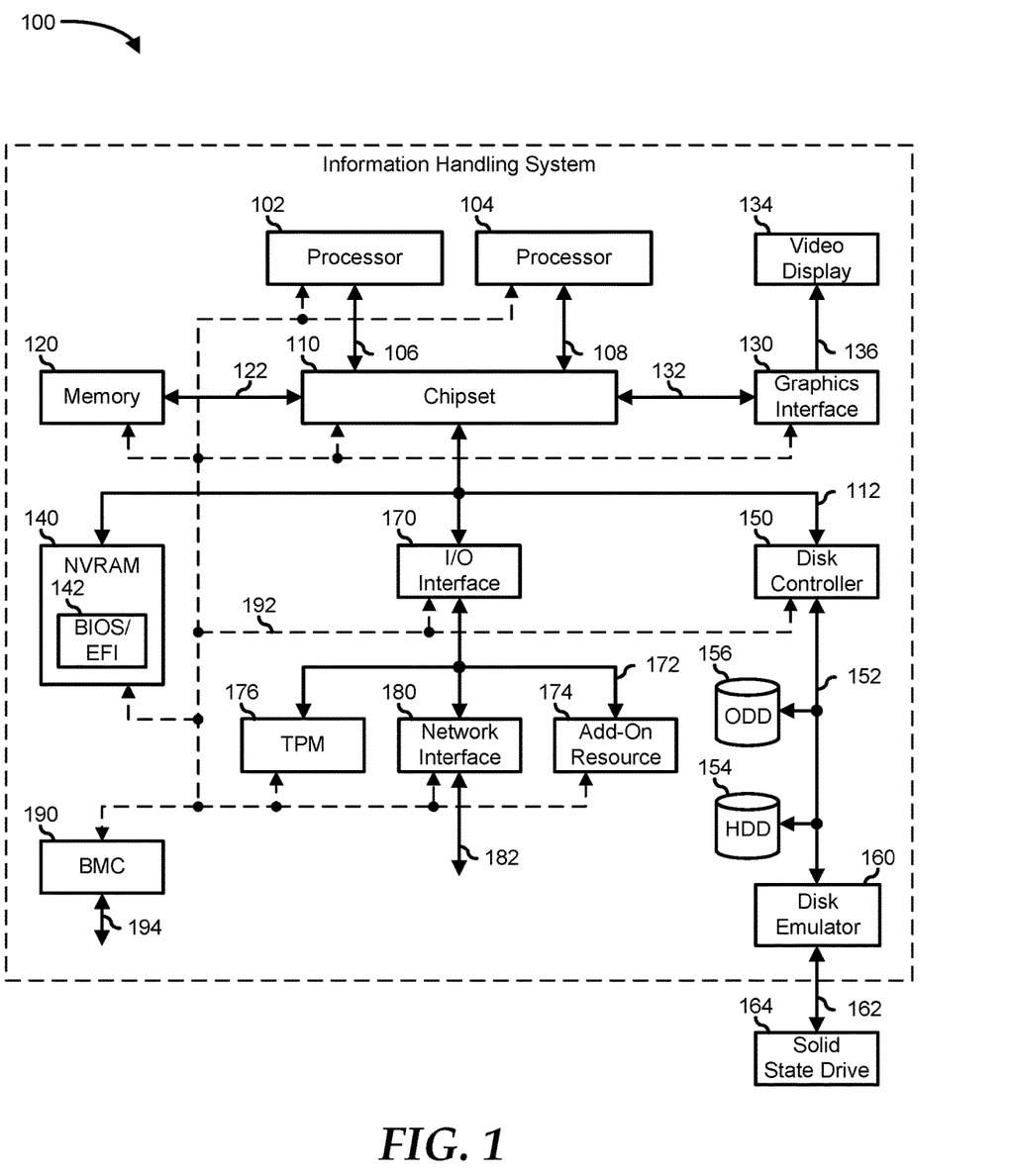
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a Southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Multiple BIOS images have been used to support different platforms. Current designs allow the use of a single BIOS base firmware image to support different platforms. The BIOS base firmware image is updated which generally requires multiple reboots that are time-consuming. The present disclosure includes a system and method where the BIOS base firmware image is updated with a minimal number of reboots saving an administrator time.

Figure 2:
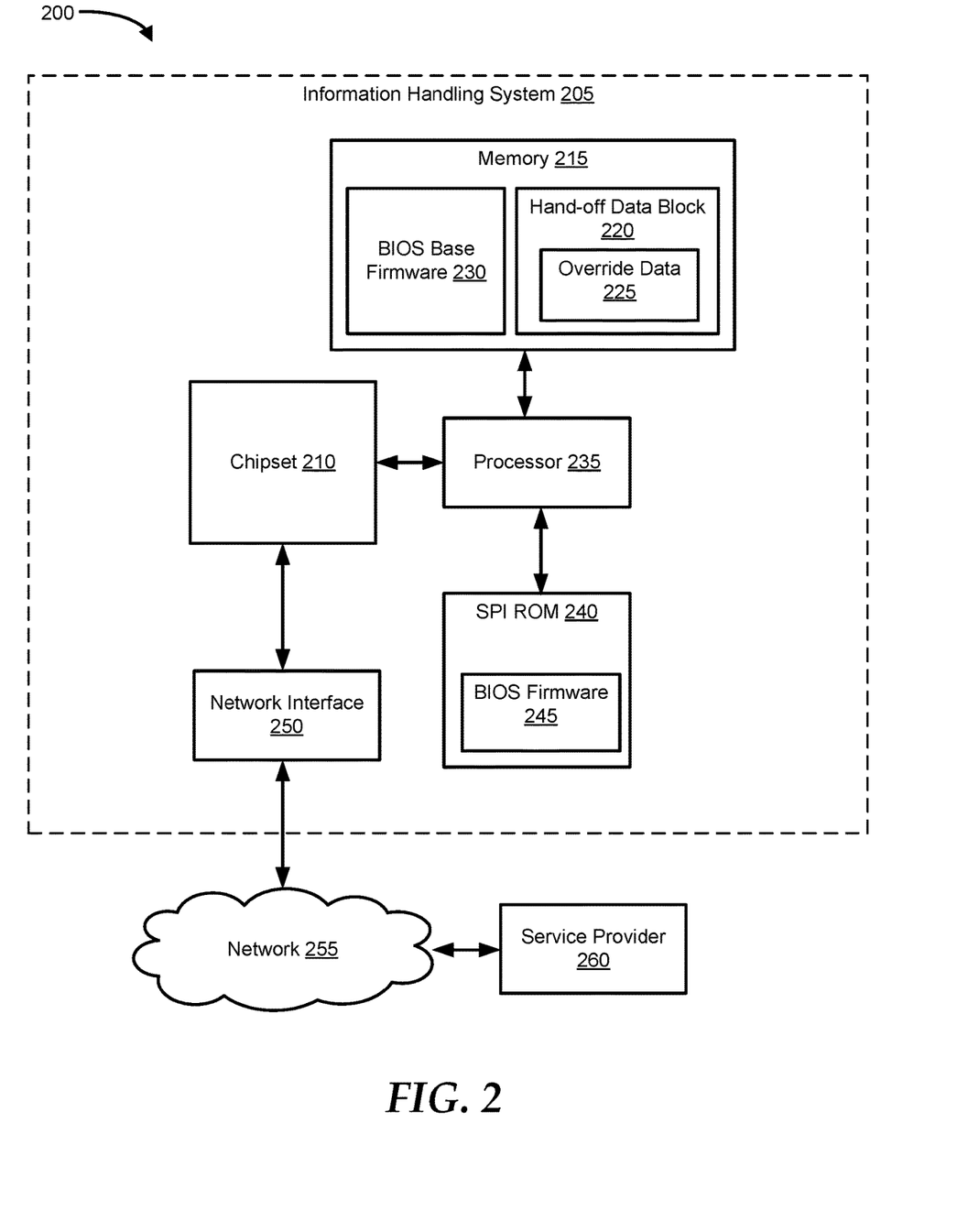
FIG. 2 is a block diagram illustrating an example of a system for dynamic configuration setting update of a BIOS firmware image, according to an embodiment of the present disclosure.

FIG. 2 shows a system 200 where systems and methods for dynamic configuration setting update of a BIOS firmware image may be implemented. System 200 includes an information handling system 205, a network 255, and a service provider 260. Information handling system 205 is similar to information handling system 100 of FIG. 1. Information handling system 205 includes a chipset 210, a memory 215, a processor 235, an SPI ROM 240, and a network interface 250. Memory 215 includes a hand-off data block 220 and a BIOS base firmware 230. SPI ROM 240 includes a BIOS firmware 245.

Chipset 210 is similar to chipset 110 of FIG. 1 may be any system, device, or apparatus configured to control certain data paths such as data flow between processor 235, memory 215, and other peripherals such as network interface 250. Chipset 210 may also support certain functions of processor 235. Chipset 210 can include a platform controller hub (PCH), a fusion control hub (FCH), or the like.

Memory 215 is similar to memory 120 of FIG. 1 and includes random access memory (RAM) such as an SRAM, DRAM, NV-RAM, ROM, or the like. Memory 215 can store, for example, at least one application, an operating system, a BIOS base firmware 230, and hand-off data block 220. Memory 215 can also store platform-specific override data to be using in patching BIOS base firmware 230. Hand-off data block 220, also referred to as a hand-off block 220, is a binary data structure that passes system state information.

SPI ROM 240 may be configured to store one or more firmware volumes such as BIOS firmware 245. SPI ROM 240 may also be referred to as a flash memory device, SPI flash, BIOS NV-RAM, or the like. The storage capacity of the flash memory device is typically limited to 32 MB or 64 MB of data.

Override data 225 are platform-specific data for updating configuration settings in BIOS base firmware 230. Override data 225 may be used to configure specific functions within chipset 210 and processor 235 early in the boot process, such as in the PEI phase. For example, Intel® implements PCH soft straps to configure specific functions within the chipset or a PCH that reads the soft strap data from the SPI ROM. In another example, AMD implements the platform security processor (PSP) configuration blocks to set different configurations on the chipset or FCH. PCH soft straps and PSP configuration blocks are examples of programmable hardware configurations provided by the chipset vendor so that an original equipment manufacturer (OEM) can have the flexibility to configure hardware functions.

Override data 225, may also be referred to as a patch which is a piece of code used to provide a fix to the firmware for the difference between a base platform and a target platform. Generally, a BIOS update package may include a base BIOS firmware image and one or more patches. The patch may be used to disable certain components or devices of an information handling system. For example, in TCO Legacy/Compatible mode, the host SMBus is used. In this mode, other SMBus controllers, such as Intel Converged Security and Management Engine SMBus controllers, are not used and could be disabled by a PCH soft strap. Each patch may include at least a flash page or simply a page of code. The page is the smallest unit of virtual flash memory that can be programmed or written to, typically of a fixed length 8-16 kilobytes in size as may be determined by processor architecture.

BIOS firmware, such as BIOS firmware 245 and BIOS base firmware 230, can be referred to as BIOS code or simply BIOS. In an embodiment, BIOS firmware can be compliant with one or more revisions of the Unified Extensible Firmware Interface (UEFI) specification. As used herein, the term EFI is used synonymously with the term UEFI. The UEFI standard replaces the personal computer BIOS system found in some older information handling systems. However, the term BIOS is often still used to refer to the system firmware.

BIOS firmware 245 includes instructions executable by processor 235 to initialize and test the hardware components of information handling system 205 and to load a boot loader or an operating system from a mass storage device. BIOS firmware 245 additionally provides an abstraction layer for the hardware, which is a consistent way for application programs and operating systems to interact with the keyboard, display, and other input/output devices. When power is first applied to information handling system 205, the system begins a sequence of initialization procedures. During the initialization sequence, also referred to as a boot sequence, components of information handling system 205 are configured and enabled for operation, and device drivers can be installed.

During the lifetime of the information handling system 205, it may become necessary or advisable to update the BIOS firmware 245 with a new firmware version, such as with BIOS base firmware 230. This procedure is often referred to as flashing the BIOS. The BIOS firmware may be updated using a BIOS update package that typically includes a base BIOS firmware image that supports multiple platforms such as BIOS base firmware 230. During this process, the previous BIOS firmware can be deleted, and the revised BIOS firmware can be stored at the flash memory device. For example, BIOS firmware 245 may be deleted and BIOS base firmware 230 may be stored at SPI ROM 240 instead.

Typically, updating the BIOS firmware includes multiple reboots resulting in a longer downtime. For example, after flashing the BIOS firmware image in the SPI ROM, the information handling system is rebooted. After reboot, the BIOS firmware is patched, and then the information handling system is rebooted again. Techniques disclosed herein overcome these issues by updating a portion of BIOS base firmware before flashing or updating the SPI ROM. Configuration settings may be updated into BIOS base firmware 230 before storing it at SPI ROM 240 replacing BIOS firmware 245. That is, the configuration settings are patched in the BIOS base firmware 230 with override data 225 before the update of BIOS firmware 245. For example, a dynamic update of the PCH soft straps is performed to BIOS base firmware 230 directly before the update of the BIOS firmware 245 in SPI ROM 240 instead of patching the PCH soft straps into SPI ROM 240. This allows the BIOS firmware to be updated with minimal reboot.

BIOS base firmware 230 may be part of a BIOS firmware update package from service provider 260 that is downloaded via network 255 which is connected to information handling system 205 through network interface 250. BIOS base firmware 230 may be stored in memory 215 which will be used to update BIOS firmware 245. BIOS base firmware 230 may support multiple platforms. However, one platform is chosen as a default platform and then a configuration setting in BIOS base firmware 230 may be patched to support a different platform.

For example, if BIOS base firmware 230 supports platform A as the default platform, then BIOS base firmware 230 may be used without a patch when updating the BIOS firmware 245 if information handling system 205 is configured as platform A. Accordingly, if BIOS base firmware 230 is used to update a BIOS firmware 245 wherein information handling system 205 is configured as platform B, then BIOS base firmware 230 is patched before the update. By applying the patch to BIOS base firmware 230 before the update, additional reboots are minimized if not eliminated which minimizes downtime of information handling system 205. The update may be performed during the pre-EFI initialization (PEI) phase of the power-on self-test (POST) process.

BIOS base firmware 230 may include information associated with the default platform and other platforms it supports, such as a platform identifier. Based on the platform identifier, the configuration of the platform and its configuration settings may be determined. For example, the platform identifier may include information associated with instruction set architecture (ISA), BIOS developer, revision level, release number, etc. In addition, hardware components of an information handling system associated with the platform identifier may also be determined.

In an embodiment, system settings at the information handling system can be stored at a system settings store in an NV-RAM or other persistent memory. A PEI module may be configured to change a particular system setting can allocate a portion of the cache, such as a hand-off data block (HOB). Further, the PEI module can populate the hand-off data block with a new system setting value, to which a current value of the particular system setting is to be changed during the drive execution environment (DXE) phase when a write driver becomes available to write the new system setting value to the system settings store at the NV-RAM or other persistent memory. For example, hand-off data block 220 may change the particular system setting with override data 225.

Figure 3:
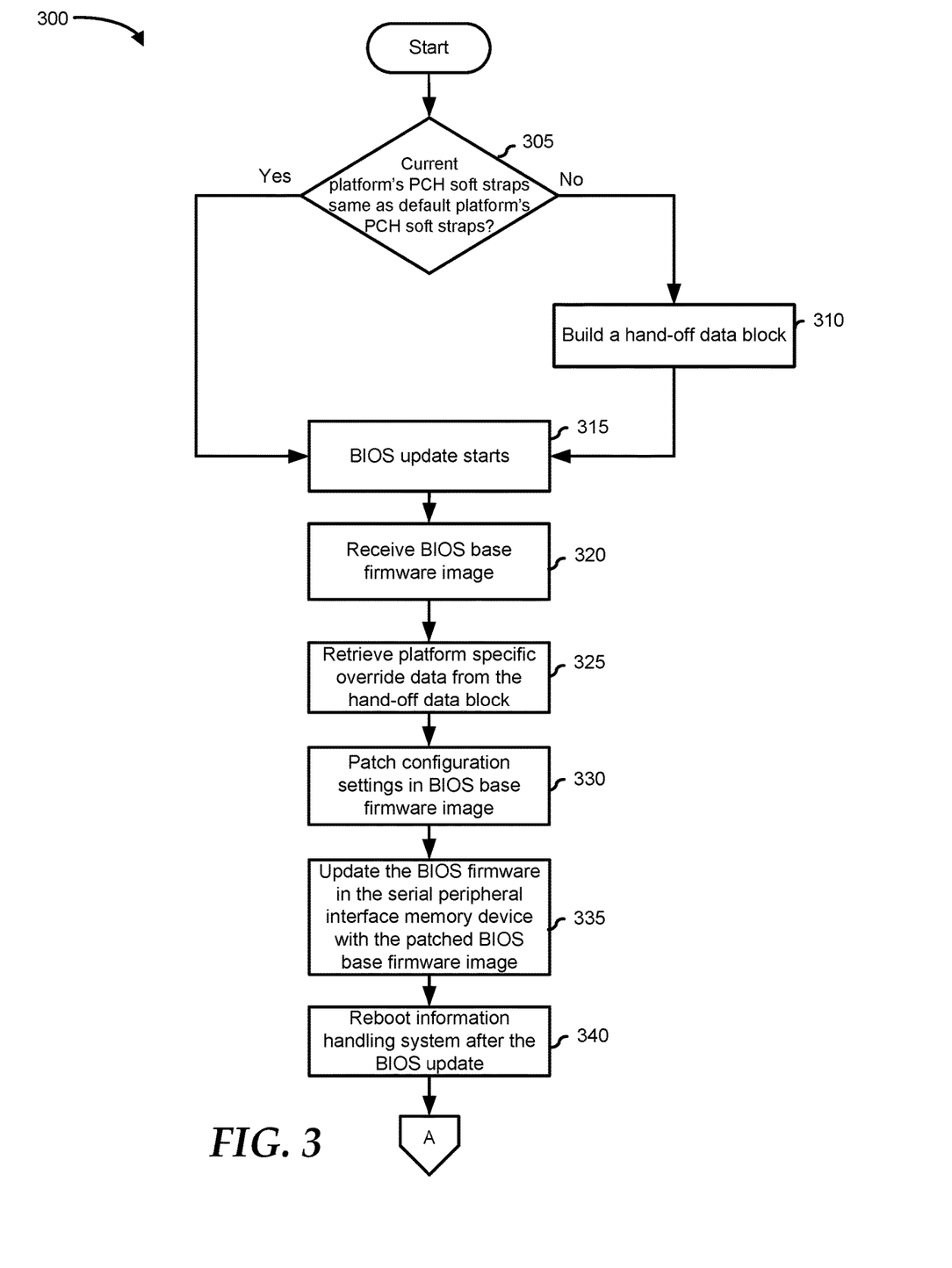
FIG. 3 is a flowchart illustrating an example of a method for dynamic configuration setting update of a BIOS firmware image, according to an embodiment of the present disclosure.

FIG. 3 illustrates a method 300 for performing dynamic BIOS update for an information handling system. While embodiments of the present disclosure are described in terms of system 200 of FIG. 2, it should be recognized that other systems may be utilized to perform the described method.

Method 300 typically starts at decision block 305 where the method determines whether the current platform's PCH soft straps is the same as the default platform's PCH soft straps. The current platform refers to the platform of the information handling system to be updated. The comparison is performed during the PEI phase. Here, method 300 may compare the current platform's override data of the BIOS firmware, such as BIOS firmware 245 of FIG. 2 with the override data of the default platform, such as override data 225. If the current platform PCH soft straps override data is the same as the default platform's PCH soft straps override data, then the "YES" branch is taken and the method proceeds to block 315 where the update of the current platform's BIOS firmware starts during the DXE phase. If the current platform's PCH soft straps override data is not the same as the default platform's PCH soft straps override data, then the "NO" branch is taken and the method proceeds to block 310.

At block 310, the method builds a hand-off data block during the PEI phase. The hand-off data block may be used to store platform-specific override data which is used to patch the BIOS base firmware image. The method proceeds to block 320 wherein a BIOS firmware update for the information handling system is received. The BIOS firmware update may be received as a BIOS firmware update package which includes a BIOS base firmware image that is stored in a non-volatile memory of the information handling system.

The method proceeds to block 325 where the method retrieves the platform-specific configuration setting override data, such as platform-specific PCH soft strap override data, from the hand-off data block during the DXE phase. The method proceeds to block 330 where the method patches the BIOS base firmware image with the platform-specific configuration setting override data. The patch may be determined based on the difference between the default platform and the platform to be updated. If the default platform is platform A and the platform to be updated is platform B, then the method may determine the difference between platform A and platform B. For example, platform A and B may have different hardware layouts. The layout may be based on the form factors of the two platforms, wherein platform A may be a rack server and platform B may be a blade server. As such, there may be differences in the components of the two platforms. To accommodate the difference between the two platforms the target platform is patched. Patching includes modifying or updating the configuration settings to modify or update a platform's hardware design allowing the flexibility to support different platforms. Modifying or updating the configuration settings includes modifying the functions of the BIOS base firmware image, such as BIOS base firmware 230 of FIG. 2, used to support other platforms. For example, with an Intel platform, PCH soft straps are used to configure a platform's hardware design. The patching of the PCH soft straps is also referred to herein as a dynamic update of PCH soft straps.

The method proceeds to block 335 where the method updates the BIOS firmware image in the SPI ROM with the patched BIOS base firmware image. After updating the BIOS firmware image, the method reboots the information handling system at block 340. After the reboot, the method proceeds to decision block 405 of FIG. 4.

Figure 4:
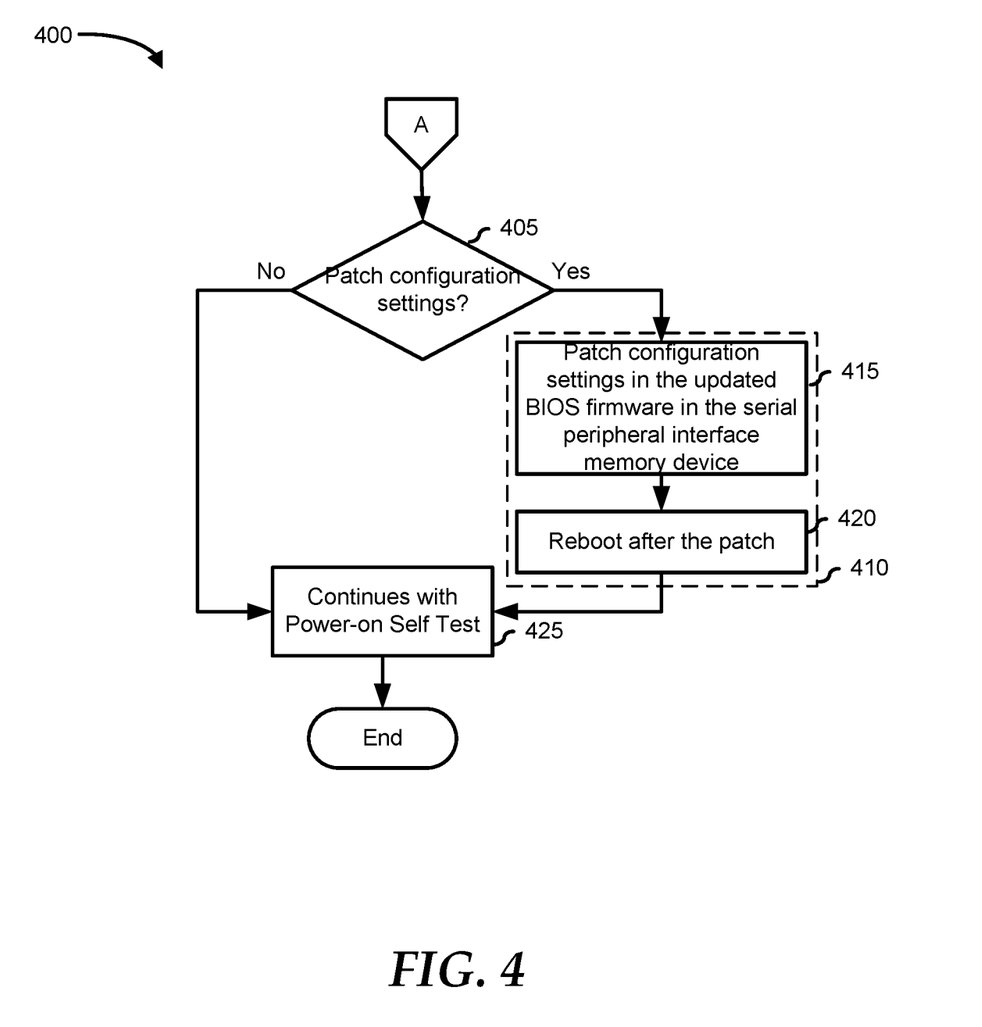
FIG. 4 is a flowchart illustrating an example of a method for dynamic configuration setting update of a BIOS firmware image that is a continuation of FIG. 3, according to an embodiment of the present disclosure.

FIG. 4 illustrates a method 400 for performing dynamic BIOS update for an information handling system which is a continuation of method 300 of FIG. 3. While embodiments of the present disclosure are described in terms of system 200 of FIG. 2, it should be recognized that other systems may be utilized to perform the described method.

Method 400 typically starts at decision block 405, where the method determines whether to patch a configuration setting of the BIOS firmware image in the SPI ROM. For example, the method determines whether to patch a PCH soft strap. If the method determines that a configuration setting is to be patched, then the "YES" branch is taken and the method proceeds to block 410. If the method determines that the configuration setting is not to be patched, then the "NO" branch is taken and the method proceeds to block 425.

Block 410 includes block 415 and block 420. The method generally does not reach block 410 as the configuration settings have already been patched at block 325 of FIG. 3 during the dynamic BIOS update. Block 410 may be reached in instances where the current BIOS firmware is not operational, such as during a BIOS firmware recovery or an offline BIOS firmware update which occurs less than 10% of the time. At block 415, the method patches the configuration setting in the BIOS firmware in the SPI ROM. For example, the method modifies or updates the functions of BIOS firmware such as BIOS firmware 245 in FIG. 2. The method proceeds to block 420, where the method reboots the information handling system after the patch. The method proceeds to block 425. At block 425, the method continues with the POST process. The method ends after the POST process.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, decision block 310 and block 315 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    storing, by a processor, a basic input/output system (BIOS) base firmware image of a first platform in a memory of an information handling system of a second platform:
    determining whether a first platform controller hub soft strap of the first platform is the same as a second platform controller hub soft strap of the second platform:
    in response to determining that the first platform controller hub soft strap of the first platform is different than the second platform controller hub soft strap of the second platform, building a hand-off block for platform specific override data for the second platform;
    patching the BIOS base firmware image, including modifying the BIOS base firmware image with the platform specific override data; and
    subsequent to the patching the BIOS base firmware image, updating a BIOS firmware in a serial peripheral interface (SPI) flash memory device with the BIOS base firmware image.

2. The method of claim 1, wherein the BIOS base firmware image supports multiple platforms.

3. The method of claim 1, wherein the patching includes configuring functions of the BIOS base firmware image according to the second platform.

4. The method of claim 1, wherein the patching the BIOS base firmware image includes configuring a platform controller hub soft strap for the second platform with the platform specific override data.

5. The method of claim 1, wherein the building of the hand-off block is performed during a pre-extensible firmware interface initialization phase.

6. The method of claim 5, further comprising retrieving the platform specific override data from the hand-off block prior to the patching.

7. The method of claim 5, wherein the hand-off block is located in the memory.

8. The method of claim 1, wherein the patching the BIOS base firmware image is performed during a driver execution environment (DXE) phase.

9. The method of claim 7, further comprising determining the platform specific override data based on a difference between the first platform and the second platform.

10. An information handling system, comprising:
    a memory to store a basic input/output system (BIOS) base firmware image of a first platform;
    a serial peripheral interface (SPI) flash memory device with a BIOS firmware of a second platform; and
    a processor configured to:
    determine whether a first platform controller hub soft strap of the first platform is the same as a second platform controller hub soft strap of the second platform;
    in response to a determination that the first platform controller hub soft strap of the first platform is different than the second platform controller hub soft strap of the second platform, build a hand-off block for platform specific override data for the second platform during a pre-extensible firmware interface initialization phase;
    patch the BIOS base firmware image with the platform specific override data to modify the BIOS base firmware image according to the second platform; and
    subsequent to the patch of the BIOS base firmware image, update the BIOS firmware image in the SPI flash memory device with the BIOS base firmware image.

11. The information handling system of claim 10, wherein the patch of the BIOS base firmware image is performed during a driver execution environment (DXE) phase.

12. The information handling system of claim 10, wherein the patch the BIOS base firmware image includes configuring a platform controller hub soft strap of the second platform with the platform specific override data.

13. The information handling system of claim 10, wherein the processor is further configured to determine the platform specific override data based on a difference between the first platform and the second platform.

14. The information handling system of claim 10, wherein the hand-off block is located in the memory.

15. A non-transitory computer-readable medium including code that when executed causes a processor to perform a method, the method comprising:
    storing a basic input/output system (BIOS) base firmware image of a first platform in a memory;
    determining whether a first platform controller hub soft strap of the first platform is the same as a second platform controller hub soft strap of a second platform;
    in response to determining that the first platform controller hub soft strap of the first platform is different than the second platform controller hub soft strap of the second platform, building a hand-off block for platform specific override data for the second platform;
    patching the BIOS base firmware image includes modifying configuration settings of the BIOS base firmware image with the platform specific override data; and
    then updating a BIOS firmware image in a serial peripheral interface flash memory device with the BIOS base firmware image.

16. The non-transitory computer-readable medium of claim 15, wherein the BIOS base firmware image supports multiple platforms.

17. The non-transitory computer-readable medium of claim 15, wherein the patching includes configuring functions of the BIOS base firmware image according to the second platform.

18. The non-transitory computer-readable medium of claim 15, wherein the patching the BIOS base firmware image includes configuring a platform controller hub soft strap for the second platform with the platform specific override data.

19. The non-transitory computer-readable medium of claim 15, wherein the building of the hand-off block is performed during a pre-extensible firmware interface initialization phase.

20. The non-transitory computer-readable medium of claim 15, wherein the patching the BIOS base firmware image is performed during a driver execution environment (DXE) phase.

* * * * *